United States Patent [19]

Nojiri et al.

[11] Patent Number: 5,293,594
[45] Date of Patent: Mar. 8, 1994

[54] DATA PROCESSING SYSTEM HAVING A PLURALITY OF REGISTER GROUPS AND A LOGICAL OR CIRCUIT FOR ADDRESSING ONE REGISTER OF ONE OF THE REGISTER GROUPS

[75] Inventors: Tohru Nojiri, Tokyo; Shunpei Kawasaki, Koganei; Tan Watanabe, Yokohama; Kousuke Sakoda, Hino, all of Japan

[73] Assignee: Hitachi, Ltd., Tokyo, Japan

[21] Appl. No.: 503,626

[22] Filed: Apr. 3, 1990

Related U.S. Application Data

[63] Continuation-in-part of Ser. No. 37,843, Apr. 13, 1987, Pat. No. 5,214,786, and a continuation-in-part of Ser. No. 52,873, May 22, 1987, abandoned.

[30] Foreign Application Priority Data

May 24, 1986 [JP] Japan .................... 61-119803

[51] Int. Cl.$^5$ .................... G06F 12/02; G06F 12/06
[52] U.S. Cl. .................... 395/400; 364/DIG. 1; 364/244.3; 364/245.1; 364/247.2; 364/254.3; 364/254.9; 364/259.1
[58] Field of Search .................... 364/DIG. 1; 395/400

[56] References Cited

U.S. PATENT DOCUMENTS

| | | | |
|---|---|---|---|
| 4,042,911 | 8/1977 | Bourke et al. | 364/900 |
| 4,648,035 | 3/1987 | Fava et al. | 364/200 |
| 4,777,588 | 10/1988 | Case et al. | 364/200 |
| 4,853,849 | 8/1989 | Bain et al. | 364/200 |

*Primary Examiner*—Eddie P. Chan
*Assistant Examiner*—Kakali Chaki
*Attorney, Agent, or Firm*—Antonelli, Terry Stout & Kraus

[57] ABSTRACT

In order to divide a memory addressed unidimensionally into a plurality of memory areas and to manage efficiently these memory areas, the address to be accessed inside the memory is determined on a software basis by a computer instruction by use of the value of a first pointer designating each memory area and the value of a second pointer designating the relative address in the designated memory area.

13 Claims, 5 Drawing Sheets

DATA PROCESSING SYSTEM HAVING A PLURALITY OF REGISTER GROUPS AND A LOGICAL OR CIRCUIT FOR ADDRESSING ONE REGISTER OF ONE OF THE REGISTER GROUPS

CROSS REFERENCE TO RELATED APPLICATIONS

This application is a continuation-in-part of (1) prior copending U.S. application Ser. No. 037,843, filed Apr. 13, 1987, now U.S. Pat. No. 5,214,786, the entire disclosure of which is hereby incorporated herein by reference, and (2) prior co-pending U.S. application Ser. No. 052,873, filed May 22, 1987, now abandoned.

BACKGROUND OF INVENTION

This invention relates to an access mechanism for making access to a memory such as a large capacity register file by use of a pointer, and more particularly to a method and apparatus for memory access which can simplify a pointer (address) generation circuit and improve its operation speed and is suitable for making an access method versatile.

In conventional systems such as Sword 32, an activation record (context) as data having high access frequency is allocated to a register file to which access can be made at a high speed, as described, for example, in Proceeding of the International Conference on Fifth Generation Computer Systems, (1984), p.p. 389-397.

In accordance with a method of keeping the activation records by an ordinary software, they are linearly allocated on one stack and access to all the data in the activation records is made in correspondence to a pointer. However, the activation records consist of an area which contains control information for procedure execution which has the same size and a stack area whose size is not always constant.

In Sword 32 described above, the system has a function of making it possible to use part of the register file as a bank register and the area which contains control information for procedure execution for each activation record is allocated to each bank. Furthermore, the system includes a hardware which permits the access of data in the control information for procedure execution corresponding to the activation record which is being activated at the address inside the bank in order to improve the access speed.

The Sword 32 system is designed to execute particularly efficiently a program described by Smalltalk-80 language. In a program of this Smalltalk-80 language, a compiler guarantees that no stack overflow occurs so long as the stack is pushed or popped. For this reason, the Sword 32 system is not particularly equipped with a hardware for checking the stack overflow.

In accordance with the prior art technique described above, the number of activation records allocated to register files and the number of specific registers of each register file are fixed, and no consideration is given to the fact that the ratio of the optimum number of data in the register file varies with a programming language applied and with an application program. For this reason, there is the problem as to the versatility of a microprocessor.

A program described by an ordinary programming language must detect a stack overflow during execution as to the operation of a stack push and pop and if a microprocessor is not equipped with such a detection mechanism, detection must be made by means of software causing execution efficiency to drop.

Furthermore, the prior art technique described above is not equipped with a mechanism for efficiently processing a plurality of stacks and saving and restoring processing of all the contents of a large capacity register file is necessary for every task switch causing execution efficiency to drop even further.

Depending upon application programs, on the other hand, high speed execution can be accomplished by realizing a plurality of stacks or queues for independent data management by use of register files capable of high speed access. In accordance with the prior art technique, however, no method has yet been developed which realizes a plurality of independent memory areas whose data handling is managed by pointers such as stacks, and which have freedom capable of designating a desired size by software and can efficiently realize an overflow detection mechanism by use of a memory such as a register file which is addressed unidimensionally.

SUMMARY OF THE INVENTION

With the background described above and to solve the problems of the prior art, the present invention is directed to provide (1) an access mechanism for a memory which makes it possible to manage a memory such as a register file which is addressed unidimensionally by dividing it into several memory areas; (2) an access mechanism for a memory which makes it possible to designate the size and number of the memory regions described above by software; (3) an access mechanism which accesses efficiently a plurality of memory areas whose data handling can be managed independently by pointers such as stacks having an overflow detection mechanism; and (4) an access mechanism which can accomplish efficiently the management of the memory areas corresponding to respective tasks in order to efficiently process a plurality of tasks.

In a memory access mechanism for managing a memory area of a memory which is addressed unidimensionally by dividing the memory area into a plurality of memory areas, the object of the present invention described in item (1) can be accomplished by a memory access mechanism including pointer (address) generation means for determining the value of an access pointer which designates the address of the memory area to be accessed, by use of the value of a first designating pointer for designating the memory area among a plurality of divided memory areas and the value of a second designating pointer for designating the relative address in the designated memory area.

The object of the invention described in item (2) can be accomplished by pointer generation means for making arbitrary n bits among an N-bit first designating pointer the valid bits with the other N−n bits being the invalid bits, for making the N−n bits of an N-bit second designating pointer, which correspond to the positions of the invalid bits of the first designating pointer, the invalid bits with the other n bits being the invalid bits, and for generating an N-bit access pointer by use of the valid bits of these pointers, and by making it possible to designate the bit number and positions of the valid bits of these two designating pointers by means of program.

The object described in item (3) can be accomplished by making one of the two designating pointers, which are necessary for designating the address to be accessed of the memory addressed unidimensionally, a value for selecting one data memory area among a plurality of data memory areas for managing independently the handling of the data and making the other pointer a pointer for managing the handling of the data.

Overflow of the pointer for managing handling of the data such as a stack pointer can be detected by checking the propagation of a carry during calculation in the pointer operation.

In a memory access mechanism for managing a memory area, which is addressed unidimensionally, by dividing the memory area into a plurality of memory areas, the object described in item (4) can be accomplished by a memory access mechanism equipped with pointer (address) generation means for designating the address of the memory area to be accessed by use of the value of a first designating pointer for designating a task-oriented memory area group consisting of several partial areas, the value of a second designating pointer for designating the memory area in the designated task-oriented memory area group and the value of a third designating pointer for designating the relative address in the designated memory area.

DESCRIPTION OF THE PREFERRED EMBODIMENTS

First of all, the principle of the present invention will be described with memory address designation of a bank structure by way of example.

In a memory access mechanism for managing $2^n$ memory areas from 0th bank to $2^N-1$ th bank consisting of $2^{N-n}$ words by use of a memory consisting of $2^N$ words, two N-bit width pointers used for designating the access address will be called a "bank designating pointer" and an "offset designating pointer", respectively.

In this case, the sequence number of the bank accessed is designated so that the lower $N-n$ bits of the bank designating pointer are always "0" as invalid bits and its upper n bits, as valid bits. On the other hand, offset inside the bank of the words to be accessed is designated so that the upper n bits of the offset designating pointer are invalid bits and always "0" while the lower $N-n$ bits are valid bits field.

Therefore, the value of the bank designating pointer is $a \times 2^{N-n}$ when designating the ath bank while the value of the offset designating pointer becomes the offset value in the bank of the word to be accessed.

In this manner, the values of the two pointers are managed and logical OR is calculated for their corresponding bits so that the value of the access pointer designating the address to be actually accessed in the memory is generated.

Here, the lower $N-n$ bits field of the access pointer become the lower $N-n$ bits field of the offset designating pointer, that is, the value of offset inside the bank, while the upper n bits field become the upper n bits field of the bank designating pointer, that is, the sequence number of the bank. Therefore, the value obtained by combining these two pointers and the value of the access pointer has 1:1 correspondence and no erroneous operation occurs.

In order to accomplish $2^n$ memory regions of the $2^{N-n}$ words for managing handling of the data by the pointer such as a stack or a queue by use of the memory of $2^N$ words realizing the operation described above, the bank designating pointer exhibits the function of selecting one area as the object of access from a plurality of independently managed memory area, while the offset, designating pointer operates as the pointer which selects one word that memory area.

Therefore, when the valid bits field of the offset designating pointer are the lower $N-n$ bits, the updating operation of the pointer for selecting one word is either increment or decrement on the one-by-one basis but when the effective bits are the upper $N-n$ bits, the erroneous operation can be prevented by effecting the increment or decrement operation on the $2^n$ basis.

The overflow of the memory system for selecting one word by the pointer such as a stack occurs in the following cases. When the valid bits field of the offset designating pointer are the upper $N-n$ bits, the overflow occurs when decrement is made while the pointer for selecting one word is "0" or when increment is made while that pointer is $(2^{N-n}-1) \times 2^n$. When the valid bits field of the offset designating pointer are the lower $N-n$ bits, on the other hand, the overflow occurs when decrement is made while the pointer for selecting one word is "0" or when increment is made while that pointer is $2^{N-n}-1$.

Therefore, the erroneous operation can be prevented by detecting abnormality from a carry signal from the upper-most bit of an N-bit operator for updating the pointer in the former case and from a carry signal from the $N-$nth bit when LSB is set to the 0th bit in the latter case.

Hereinafter, preferred embodiments of the present invention will be described in detail with reference to the accompanying drawings.

Figure 1:
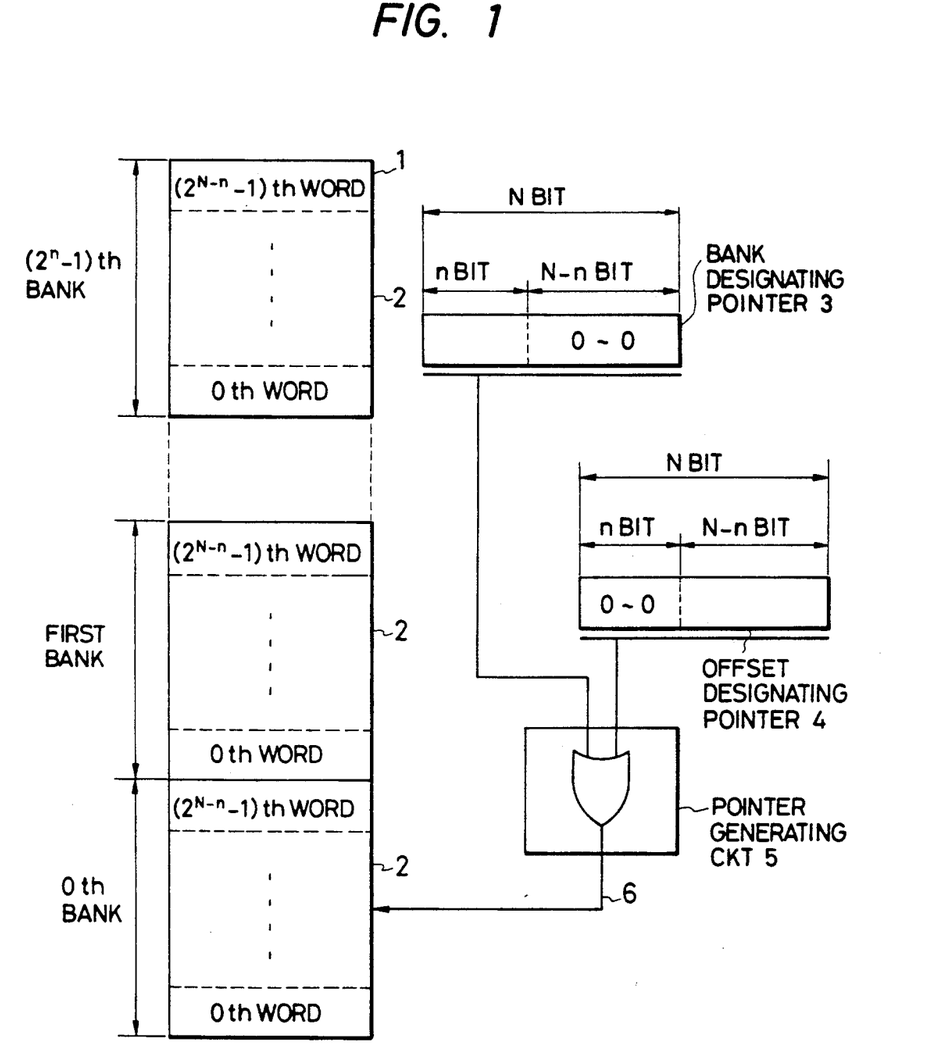
FIG. 1 shows the concept of the present invention.

FIG. 1 is a conceptual view of the access mechanism of a $2^N$ word-memory which is addressed unidimensionally. In FIG. 1, $2^n$ banks each consisting of a $2^{N-n}$ word memory area are shown accomplished by use of memories. In the drawing, two N-bit wide pointers, that is, a bank designating pointer 3 and an offset designating pointer 4, are disposed in order to designate the address to be accessed in the memory 1.

A pointer (address) generating circuit 5 consists of an OR circuit and generates an access pointer (address) 6 designating the access word in the memory 1 by calculating the logical OR between the corresponding bits from the combination of the bank designating pointer 3 and the offset designating pointer 4.

Management is made by software so that the upper n bits field of the bank designating pointer 3 represents the sequence number of the bank 2 to be accessed, as the valid bits while its lower $N-n$ bits are always "0" as the ineffective bits. Similarly, management is made by software so that the lower $N-n$ bits of the offset designating pointer 4 represents the offset value of the word to be accessed actually in the bank 2 which is designated by the bank designating pointer, while its upper n bits are always "0" as the invalid bits.

Therefore, the access pointer (address) 6 generated by the pointer (address) generating circuit 5 which inputs the bank designating pointer 3 and the offset designating pointer 4 cones to possess the upper n bits of the bank designating pointer 3 as its upper n bits and the lower N−n bits of the offset designating pointer 4 as its lower N−n bits.

It is of course possible to change the valid field of the bank designating pointer 3 to the lower N−n bits and the valid field of the offset designating pointer 4 to the upper n bits. In this case, the address of the word contained in one bank 2 is every $2^{N-n}$.

The sequence number of the bank 2 to be addressed or the offset value of the word to be accessed in the bank can be designated also by a value contained in the instruction of an instruction processing apparatus for making access to the memory 1 in this embodiment in place of the bank designating pointer 3 or the offset designating pointer 4.

A microprocessor of the type wherein the memory 1 and the instruction processing apparatus are integrated in one LSI chip can be accomplished as a specific case of this embodiment.

The embodiment described above provides the effect that the word number of the bank 2 can be determined dynamically in accordance with the characteristics of the program to be executed in practice, by designating and managing the invalid field of the bank designating pointer 3 and offset designating pointer 4 by software.

The embodiment described above provides another effect that the pointer (address) generating circuit 5 for generating the access pointer 6 which represents the position of the word designated by the bank designating pointer 3 and the offset designating pointer 4 can be constituted by the simple OR circuit alone.

Figure 2:
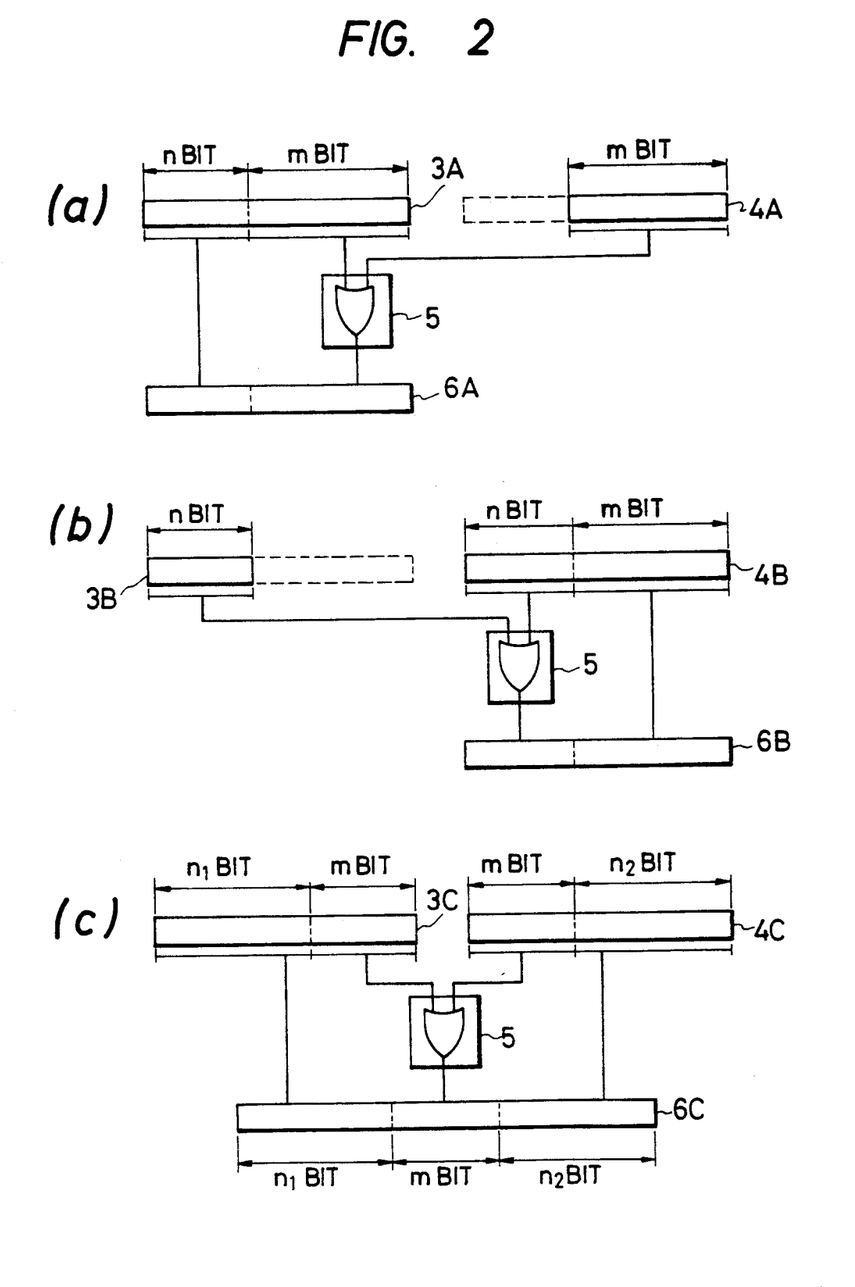
FIGS. 2(a) to 2(c) are conceptual views showing the construction method of a pointer (address) generation circuit.

FIG. 2 shows the concept relating to the mechanism of the pointer generating circuit other than one shown in FIG. 1. In FIG. 2(a), the bit width of the bank designating pointer 3A is n+m and the bit width of the offset designating pointer 4A is m. They are used in order to generate an (m+n)-bit access pointer (address) 6A.

The value of the upper n bits of the access pointer 6A directly takes the value of the upper n bits of the bank designating pointer 3A but its lower m-bit value is the value obtained by calculating the logical OR for each bit between the lower m bits of the bank designating pointer 3A and the offset designating pointer 4A by the pointer generating circuit 5 consisting of the OR circuit.

Here, it will be readily obvious that the operation can be carried out smoothly without any problem even if the bank designating pointer 3A and the offset designating pointer 4A are replaced by each other.

In FIG. 2(b), the bit width of the bank designating pointer 3B is n and the bit width of the offset designating pointer 4B is m+n, and they are used to generate an (m+n)-bit access pointer 6B. The value of the lower a bits of the access pointer 6B directly takes the value of the lower m bits of the offset designating pointer 4B while the value of its upper n bits is the value obtained by calculating the logical OR for each bit between the bank designating pointer 3B and the upper n bits of the offset designating pointer 4B by the pointer generating circuit 5 consisting of the OR circuit.

Here, it will be obvious that the operation can be carried out smoothly without any problem even if the bank designating pointer 3B and the offset designating pointer 4B are replaced by each other.

In FIG. 2(c), the bit width of the bank designating pointer 3C is $n_1+m$ while the bit width of the offset designating pointer 4C is $m+n_2$ and they are used to generate an $(n_1+m+n_2)$-bit access pointer 6C. The value of the upper $n_1$ bits of the access pointer 6C directly takes the value of the upper $n_1$ bits of the bank designating pointer 3C and the value of its lower $n_2$ bits directly takes the value of the lower $n_2$ bits of the offset designating pointer 4C. The remaining m bits of the access pointer 3C are the value obtained by calculating the logical OR for each bit between the lower m bits of the bank designating pointer 3C and the upper m bits of the offset designating pointer 4C by the pointer generating circuit 5 consisting of the OR circuit.

It will be obvious that the operation can be carried out smoothly without any problem even if the bank designating pointer 3C and the offset designating pointer 4C are replaced by each other.

Figure 3:
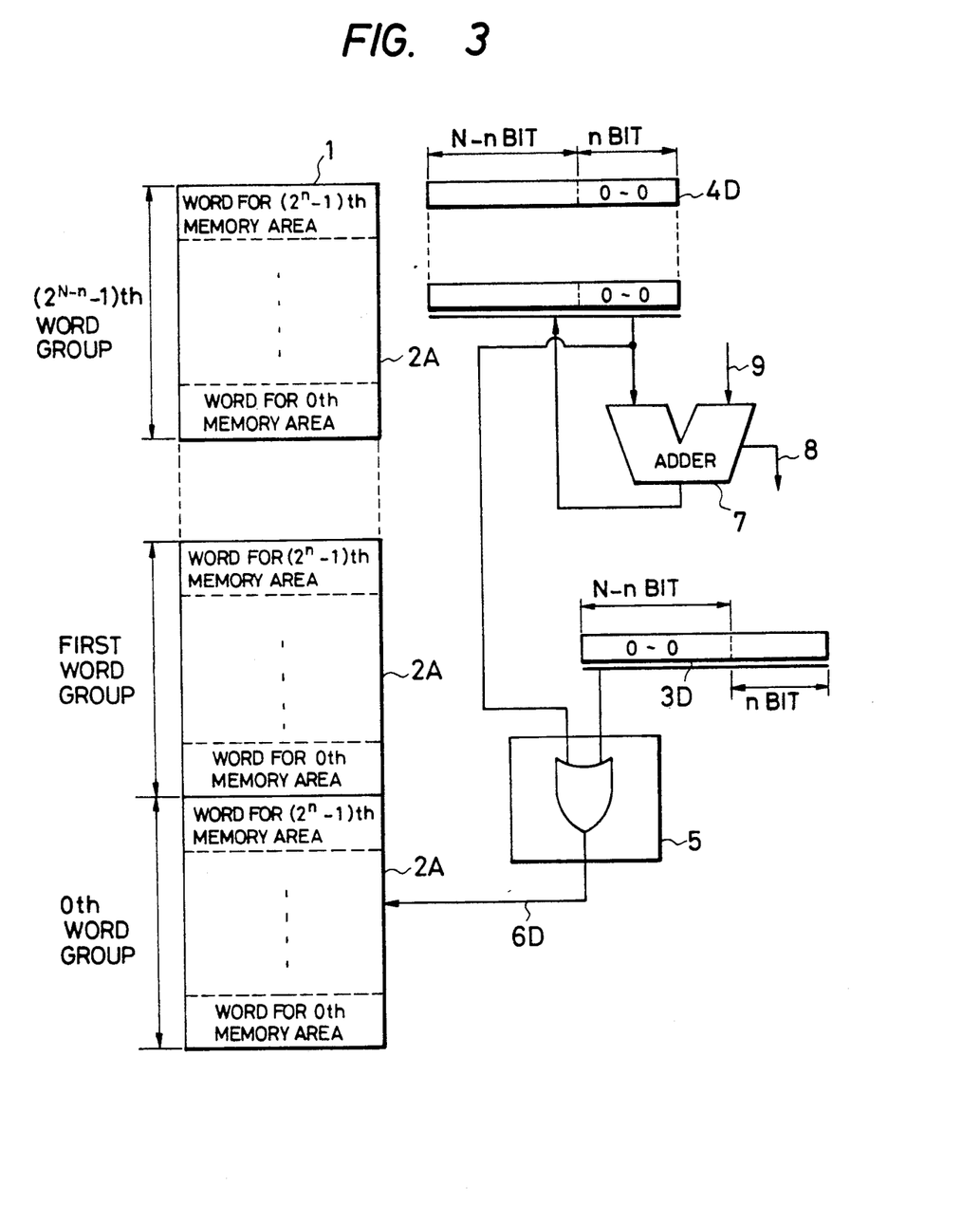
FIG. 3 is a structural view of a memory as an embodiment of the present invention.

FIG. 3 shows an embodiment wherein $2^n$ memory areas 2A each consisting of $2^{N-n}$ words and being managed independently of other such as a stack or a queue are accomplished by use of the $2^N$-word memory by utilizing the concept of the present invention described above.

The memory area designating pointer 3D selects one memory area from the $2^n$ memory areas and is managed by software so that the value of its lower n field represents the sequence number of the designated memory area while its upper N−n field bits are always "0" as the invalid bits.

A pointer register group 4D consists of a group of pointers corresponding to the $2^n$th power memory areas whose data handling is managed by the pointer. Each of the pointers in the pointer register group 4D manages the input or output, or both of the input and output, of the data of the corresponding memory area 1. Management by software is made so that the value of the upper N−n bits of the pointer represents the word number of the corresponding memory area and its lower n bits are always "0" as the invalid bits.

Therefore all the pointers in the pointer register group 4D take the values which are some multiples of $2^n$. The access pointer 6D which actually selects the word to be accessed is generated by the pointer generating circuit 5 which inputs the memory area designating pointer 3D and the corresponding pointer of the pointer register group 4D which executes processing for the memory area 1 designated by the memory area designating pointer 3D.

The value of the lower n bits of the access pointer 6D is the value of the lower n bits of the memory area designating pointer 3D and its upper N−n bits is the value of the upper N−n bits of the pointer of the pointer register group 4D which is inputted to the pointer generating circuit 5 at that time. The i-th words of all the memory areas are allocated to the i-th field groups 2A.

An adder 7 plays the role of updating the value of the pointer which manages data handling. A constant input 9 designates the increment or decrement value when the adder 7 increments or decrements the pointer value.

Generally, $2^n$ is inputted as the value to the constant input 9. A carry 8 is a propagation of the carry from the (N−1)th bit which is the uppermost bit of the N-bit adder 7 and used for detecting stack overflow, stack underflow and lap-around of a ring buffer.

This embodiment provides the effect that the ratio of the number of memory areas whose data handling is managed independently when the software determines the invalid field of the memory area designating pointer 3D and those of the pointer register group 4D, to the number of words of each memory area in accordance with the characteristics of the program to be executed.

Another effect of this embodiment is that all the overflows that may occur when data are handled to and from the memory areas can be detected by the propagation of the carry from the uppermost bit of the pointer calculation for in the same way for all the memory areas.

Figure 4:
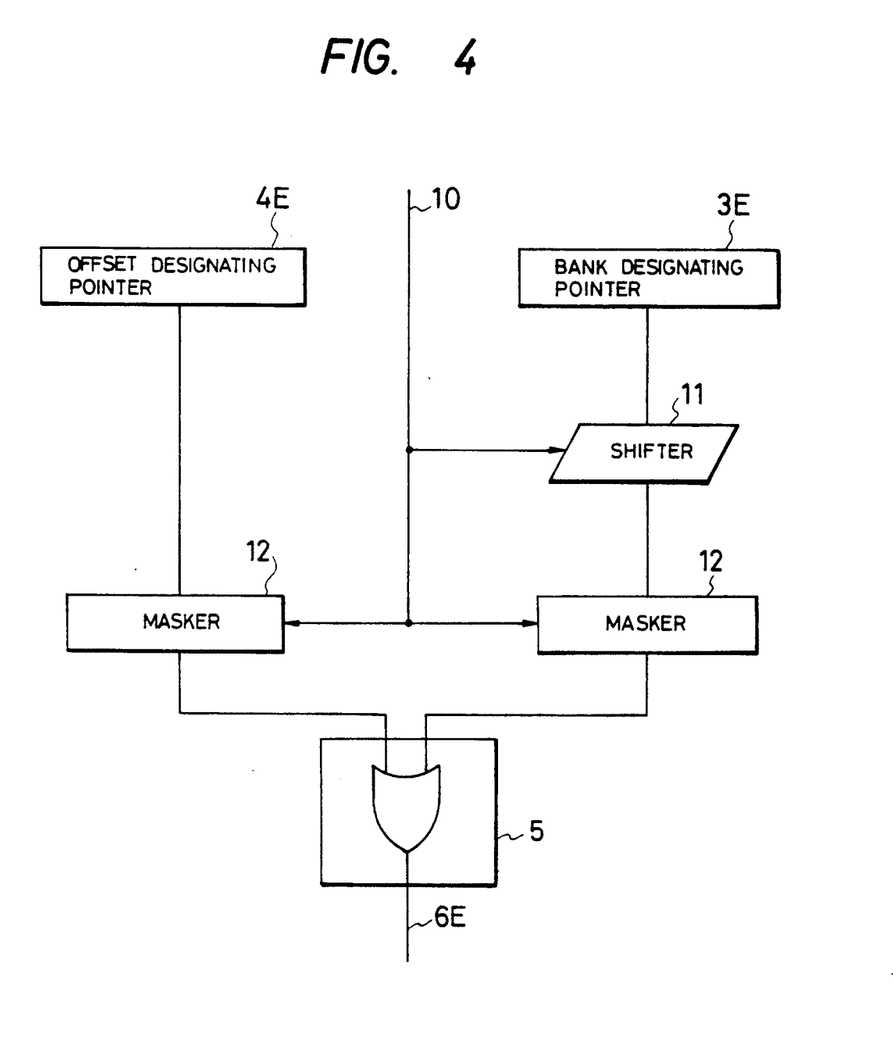
FIG. 4 is a structural view showing the principal portions of another embodiment of the present invention.

FIG. 4 is a conceptual view of hardware for assisting the management of the invalid bits of the bank and offset designating pointers 3E and 4E described above.

Reference numeral 12 represents a mask circuit, which sets compulsively the invalid field of the bank designating pointer 3E and the offset designating pointer 4E to "0" in accordance with a mask pattern which is designated in advance by pointer field designation 10.

The bank designating pointer 3E holds the sequence number of the bank to be selected as such. A shifter 11 shifts the value of the bank designating pointer 3E by the N−n bits in an MSB direction when the pointer field designation 10 designates that the upper n bits out of the N-bit width are the invalid field.

It will be obvious in this case that the operation can be carried out smoothly without any problem even if the bank designating pointer 3E and the offset designating pointer 4E are replaced by each other.

This embodiment eliminates the necessity of management by means of the software so that the invalid field of the bank and offset designating pointers 3E and 4E are always "0", by adding the mask circuit 12. The embodiment provides another effect that other information can be represented by use of the invalid field.

This embodiment provides still another effect that program modularity can be improved in that the ratio of the number of the banks to the number of the registers that constitute the bank can cope with various cases by one program, by only changing the pointer field designation by adding the shifter 11.

Figure 5:
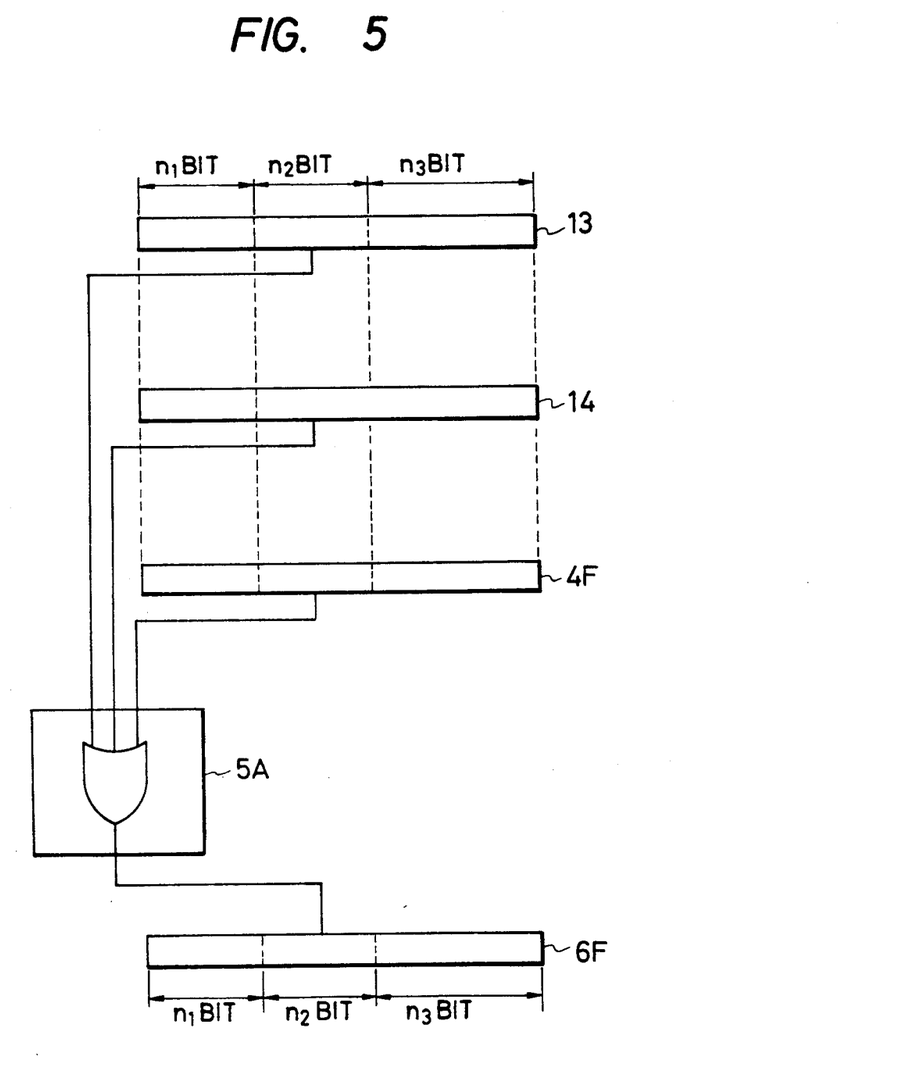
FIG. 5 is a structural view showing the principal portions of still another embodiment of the present invention.

FIG. 5 is a conceptual view of an embodiment as a system which designates the memory area to be accessed by use of a plurality of bank designating pointers, which embodiment disposes two bank designating pointers, one as a task-oriented bank group designating pointer 13 and the other as a within-task bank designating pointer 14.

The bit width of each of the task-oriented bank group designating pointer 13, the within-task bank designating pointer 14, the offset designating pointer 4F and the access pointer 6F is $n_1+n_2+n_3$. The access pointer 6F described above is generated by the pointer generating circuit 5A consisting of a 3-input OR circuit when this circuit 5A calculates the logical OR for each corresponding bit of the task-oriented bank group designating pointer 13, the within-task bank designating pointer 14 and the offset designating pointer 4F.

The task-oriented bank group designating pointer 13 is managed by software so that its upper $n_1$ bits are the valid field and represent the sequence number of the bank group allocated for each task while the other bits are always "0" as the bits.

The within-task bank designating pointer 14 is managed by software so that the $n_2$ bits subsequent to its upper $n_1$ bits are the valid field and represent the sequence number of the bank to be accessed inside the bank group allotted for a task while the other bits are always "0" as the invalid bits.

The offset designating pointer 4F managed by software so that its lower $n_3$ bits are the valid field and represent the offset value of the word to be accessed inside the bank while the other bits are always "0" as the invalid bits.

As described above, the upper $n_1$ bits of the access pointer represents the value of the valid bits of the task-oriented bank group designating pointer 13, the next $n_2$ bits of the access pointer 6F represent the value of the valid bits of the within-task bank designating pointer 14 and the lower $n_3$ bits of the access pointer 6F represent the value of the valid bits of the offset designating pointer 4F.

This embodiment provides the effect that execution efficiency can be improved when execution of a plurality of tasks is managed simultaneously, because it is necessary only to change the value of the task-oriented bank group designating pointer 13 instead of the save and restore processing of the registers which is necessary at the time of task switching.

The following can be listed as preferred embodiments of the present invention.

(1) In an access mechanism of a unidimensionally addressed memory which is divided into a plurality of memory areas, an access mechanism for a memory characterized by including a pointer generating circuit for determining the value of an access pointer which designates the address of the memory area to be accessed, by use of the value of a bank designating pointer for designating the plurality of divided memory areas and the value of an offset designating pointer which designates a relative address in the memory areas.

(2) In the memory access mechanism described in item (1), a memory access mechanism characterized in that part or the whole of the bit fields expressing binarily the value of the bank designating pointer and part of the whole of bit fields expressing binarily the value of the offset designating pointer are inputted to the pointer generating circuit described above and its output is used as the value of the access pointer.

(3) In the memory access mechanism described in item (2), a memory access mechanism characterized in that the binary expression bit fields of the access pointer are divided into the part as the output of the pointer generation circuit and the part as the value of part or the whole of the bit fields of the bank designating pointer or the part as the value of part or the whole of the bit fields of the offset designating pointer.

(4) In the memory access mechanism described in item (3), a memory access mechanism characterized in that the bit fields of the access pointer are divided into the part as the output of the pointer generating circuit and the part as the value of part or the whole of the bit fields of the offset designating pointer and the part as part or the whole of the bit fields of the bank designating pointer.

(5) In the memory access mechanism described in items (1) to (4), a memory access mechanism characterized in that a pointer generating circuit which designates a memory area to be accessed by use of a plurality of bank designating pointers and determines the value of an access pointer for designating the address of a memory to be accessed by use of the values of these pointers and the value of an offset designating pointer is formed by a multi-input OR circuit.

(6) In the memory access mechanism described in item (5) described above, a memory access mechanism characterized in that two bank designating pointers are disposed, one is used as a task-oriented bank group designating pointer while the other is used as a within-task bank designating pointer, and the pointer generating circuit is formed by a 3-input OR circuit.

(7) In the memory access mechanism described in items (1) to (6), a memory access mechanism characterized in that the pointer generating circuit is realized as a wired OR circuit having a plurality of input lines thereof connected to one output line, by making the output stage of each pointer an open collector output.

(8) In the memory access mechanism described in items (1) to (7), a memory access mechanism characterized in that the bank designating pointers are disposed in a plurality of stages and the mechanism has the function of selecting the bank designating pointer which is used to designate the memory area to be accessed in practice, or the offset designating pointers are disposed in a plurality of stages and the mechanism has the function of selecting the offset designating pointer which is used to designate the address of the memory area to be accessed in practice, or the mechanism has both of these functions.

(9) In the memory access mechanism described in items (1) to (8), a memory access mechanism characterized in that the memory areas are register groups contained in an instruction processing apparatus, and the bank designating pointer, the offset designating pointer and access pointer are realized as a register bank designating pointer, a register offset designating pointer and a register access pointer, respectively.

(10) In the memory access mechanism described in items (1) to (9), a memory access mechanism characterized in that management by software is made so that the upper n bits of an N-bit wide register bank designating pointer designate the banks on the register group as the effective bits, the lower N−n bits of the N-bit wide register offset designating pointer designate the offset in the register bank as the effective bits and the bits other than the effective bits are "0", and the value as the logical OR of these two pointers is used as the value of the register access pointer.

(11) In the memory access mechanism described in item (10), a memory access mechanism characterized in that the effective bits of the register bank designating pointer are the lower n bits and the effective bits of the register offset designating pointer are the upper N−n bits.

(12) A memory access mechanism characterized in that memory areas for managing handling of data are realized by pointers such as a stack for each register bank by use of the memory access mechanism described in items (10) and (11), a pointer for managing handling of data is disposed for each of the memory areas, a pointer corresponding to the memory area to be accessed is selected in accordance with the value of the register bank designating pointer, and the pointer is inputted to the pointer generating circuit as the register offset designating pointer together with the register bank designating pointer.

(13) In the memory access mechanism described in item (12), a memory access mechanism characterized in that the overflow of each of the memory areas for managing handling of data by the pointer is detected by propagation of a carry when the pointer inputted to the pointer generating circuit as the within-bank offset is calculated.

As described above, in a memory access mechanism for a memory wherein a memory area addressed unidimensionally is divided into a plurality of memory areas, the present invention disposes access pointer generation means for designating the address of the memory area to be accessed, by use of the value of a first designating pointer for designating the memory area among the memory areas and the value of a second pointer for designating the relative address inside the memory area. Accordingly, the present invention provides the effect that an access mechanism effective for the access to the memory area among the memory areas can be accomplished.

Furthermore, the present invention provides a remarkable effect that the invention makes it possible to designate the size and number of the memory areas by software, and a plurality of memory areas whose data handling is managed by pointers such as stacks having an overflow detection mechanism can be accomplished efficiently by use of each of these memory areas.

We claim:

1. A register access mechanism for a data processing system having a plurality of register groups for storing first information, each register group including a plurality of registers who are selectively addressable by a register address to read said first information therefrom or write said first information therein, said register access mechanism comprising:

first storing means for storing second information given by an instruction and representing one of said plurality of register groups;

second storing means for storing third information given by said instruction and representing one register of the one register group represented by said second information of said instruction; and a logical OR circuit coupled to said first and second storing means for performing an OR operation on respective bits of said second information and said third information to produce an ORed value as the register address of said one register of the one register group represented by said second and third information and outputting the register address of said one register of said one register group to said one register to read said first information therefrom or write said first information therein;

wherein said second information and said third information each include a valid part and an invalid part defined by said instruction, with the valid part of said second information being bit locations which correspond to the invalid part of said third information and vice versa, wherein bit locations in said invalid parts of said second information and said third information are always set to zero by said instruction, and wherein the valid part of said second information and the invalid part of said third information, and the invalid part of said second information and the valid part of said third information, when ORed by said logical OR circuit causes said logical OR circuit to produce an ORed value having the valid part of said second information and the valid part of said third information.

2. A register access mechanism according to claim 1, wherein the valid part of said third information is allocated to the lower n bits in said second storing means and the invalid part of said second information is allocated to the lower n bits in said first storing means.

3. A register access mechanism according to claim 1, wherein the valid part of said second information is allocated to the lower n bits in said first storing means and the invalid part of said third information is allocated to the lower n bits in said second storing means.

4. A register access mechanism for a data processing system having a plurality of register groups for storing first information, each register group including a plurality of registers which are selectively addressable by a register address to read said first information therefrom or write said first information therein, said register access mechanism comprising:

first storing means for storing second information given by an instruction and representing one of said plurality of register groups;

second storing means for storing third information given by said instruction and representing one register of the one register group represented by said second information of said instruction; and means for performing a modifying operation on said second information stored in said first storing means with a predetermined value to produce modified second information, said modifying operation being either a stack push operation or a stack pop operation, for producing a stack overflow indicator signal or stack underflow indicator signal based on said modifying operation thereby indicating a stack overflow or a stack underflow condition and for outputting the signals to said data processing system;

a logical OR circuit for performing an OR operation on respective bits of said modified second information and said third information to produce an ORed value as the register address of said one register of said one register group represented by said second information and said third information and outputting the register address of said one register of said one register group to said one register to read said first information therefrom or write said first information therein;

wherein said modified second information and said third information each include a valid part and an invalid part defined by said instruction, with the valid part of said modified second information being bit locations which correspond to the invalid part of said third information and vice versa, wherein bit locations of said invalid parts of said modified second information and said third information are always set to zero by said instruction, and wherein the valid part of said modified second information and the invalid part of said third information, and the invalid part of said modified second information and the valid part of said third information when ORed by said logical OR circuit causes said logical OR circuit to produce an ORed value having the valid part of said modified second information and the valid part of said third information.

5. A register access mechanism according to claim 4, wherein said modifying means is an adder for adding said predetermined value to said second information.

6. A register access mechanism according to claim 4, wherein said modifying means is a subtractor for subtracting said predetermined value from said second information.

7. A register access mechanism according to claim 4, wherein the valid part of said third information is allocated to the lower n bits in said second storing means and the invalid part of said second information is allocated to the lower n bits in said first storing means; and said predetermined value is $2^n$.

8. A register access mechanism according to claim 4, wherein said first storing means includes a plurality of registers each of which corresponds to a register group and is selectively accessed by an instruction.

9. A register access mechanism for a data processing system having a plurality of register groups for storing first information, each register group including a plurality of registers which may be selectively addressed by a register address to read said first information therefrom or write said first information therein, and having first and second designating pointer registers for respectively holding designating information given by instructions, said register access mechanism comprising:

first addressing means for designating one of said plurality of register groups by putting second information, given by one of said instructions and consisting of designating information, in said first designating pointer register;

second addressing means for designating one of the plurality of registers, in the one register group designated by said first address means by putting third information, given by said one of said instructions and consisting of designating information, in said second designating pointer register; and a logical OR circuit coupled to said first and second addressing means for performing an OR operation on respective bits of said second information held in said first designating pointer register and said third information held in said second designating pointer register to produce an ORed value as the register address of said one register of the one register group represented by said second information and said third information and outputting the register address of said one register of said one register group to said one register to read said first information therefrom and write said first information therein;

wherein said second information and said third information each include a valid part and an invalid part defined by said one of said instructions, said second information and said third information being N bits long, the valid part of said second information being the upper n bits thereof and the invalid part of said second information being the lower (N−n) bits thereof, and the invalid part of said third information being the upper n bits thereof and the valid part of said third information being the lower (N−n) bits thereof, wherein each bit of the invalid parts of said second information and said third information are set to zero by said instructions, and wherein the valid part of said second information and the invalid part of said third information, and the invalid part of said second information and the valid part of said third information, when ORed by said logical OR circuit causes said logical OR circuit to produce an ORed value having the valid part of said second information and the valid part of said third information.

10. A register access mechanism for a data processing system having a plurality of register groups for storing first information, each register group including a plurality of registers which are selectively addressed by a register address to read said first information therefrom or write said first information therein, and having first and second designating pointer registers for holding designating information given by instructions, said register access mechanism comprising:
- first addressing means for designating one of said plurality of register groups by putting second information, given by one of said instructions and consisting of designating information, in said first designating pointer register;
- second addressing means for designating one of the plurality of registers in the one register group designated by said first addressing means by putting third information, given by said one of said instructions and consisting of designating information, in said second designating pointer register; and
- modifying means for performing a modifying operation on said second information stored in said first designating pointer register with a predetermined value to produce modified second information, said modifying operation being either a stack push operation or a stack pop operation, and for producing a stack overflow indicator signal or a stack underflow indicator signal based on said modifying operation, thereby indicating a register overflow or a register underflow condition and for outputting said signals to the data processing system;
- a logical OR circuit coupled to said first and second addressing means for performing an OR operation on respective bits of said modified second information stored in said first designating pointer register and said third information stored in said second designating pointer register to produce an ORed value as the register address of said one register of said one register group represented by said second information and said third information and outputting the register address of said one register of said one register group to said one register to read said first information therefrom and write said first information therein;
- wherein said modified second information and said third information each include a valid part and an invalid part defined by said one of said instructions, said modified second information and said third information being N bits long, the valid part of said modified second information being the upper n bits thereof and the invalid part of said modified second information being the lower (N−n) bits thereof, and the invalid part of said third information being the upper n bits thereof and the valid part of said third information being the lower (N−n) bits thereof, wherein each bit of the invalid parts of said modified second information and said third information are set to zero by said instructions, and wherein the valid part of said modified second information and the invalid part of said third information, and the invalid part of said modified second information and the valid part of said third information, when ORed by said logical OR circuit causes said logical OR circuit to produce an ORed value having the valid part of said modified second information and the valid part of said third information.

11. A register access mechanism according to claim 10, wherein said modifying means is an adder for adding said predetermined value to said second information.

12. A register access mechanism according to claim 10, wherein said modifying means is a subtractor for subtracting said predetermined value from said second information.

13. A register access mechanism according to claim 10, wherein said first addressing means includes a plurality of registers each of which corresponds to a register group and is selectively accessed by an instruction.

* * * * *